United States Patent [19]

Tanaka

[11] 3,930,144

[45] Dec. 30, 1975

[54] DIGITAL FUNCTION FITTER

[75] Inventor: Katsuaki Tanaka, Tokyo, Japan

[73] Assignee: Iwatsu Electric Co., Ltd., Tokyo, Japan

[22] Filed: Sept. 20, 1974

[21] Appl. No.: 507,856

[30] Foreign Application Priority Data

Sept. 29, 1973 Japan .............................. 48-110033

[52] U.S. Cl. ........... 235/150.53; 235/152; 235/197; 235/92 CA

[51] Int. Cl.² .......................................... G06F 15/34

[58] Field of Search ...... 235/150.53, 197, 152, 156, 235/92 CP, 92 CA, 92 CT, 92 CC

[56] References Cited

UNITED STATES PATENTS

| | | | |
|---|---|---|---|
| 3,551,655 | 12/1970 | Walsh | 235/150.53 |
| 3,621,228 | 11/1971 | Paine et al. | 235/150.53 X |
| 3,657,657 | 4/1972 | Jefferson | 235/197 |
| 3,754,235 | 8/1973 | Dummermuth et al. | 235/150.53 X |
| 3,824,559 | 7/1974 | Grundy | 235/197 X |

*Primary Examiner*—Joseph F. Ruggiero
*Attorney, Agent, or Firm*—Woodcock, Washburn, Kurtz & Mackiewicz

[57] ABSTRACT

A digital function fitter includes an UP/DOWN counter, a clock pulse generator, a counter counting the number of the clock pulses, a plurality of gate circuits and a Multiplexer for supplying selectively the digital outputs of the gate circuits to the UP/DOWN counter.

A non-linear digital input is applied to the up-terminal of the UP/DOWN counter and the digital outputs from the gate circuits are applied to the down-terminal of the UP/DOWN counter. A linearized digital value can be obtained from the counter when the number of the non-linear digital input coincides with the digital outputs from the gate circuits.

7 Claims, 5 Drawing Figures

DIGITAL FUNCTION FITTER

BACKGROUND OF THE INVENTION

1. Field of the Invention

This invention relates to a digital function fitter and more particularly to a digital function fitter employed for linearizing any non-linear characteristic.

2. Description of the Prior Art

For example, thermoelectromotive force generated in a thermocouple is not perfectly proportional to the temperature to be measured by the thermocouple. In order to linearize such a non-linear relationship, an analog-type function fitter was hitherto employed which comprises diodes and amplifiers. However, there are problems of thermal drift and noise in the diodes and the amplifiers of the analog-type function fitter. And it is difficult to set small divisions in the linearizing function of the analog-type function fitter. Accordingly, very high accuracy cannot be expected for the analog-type function fitter. Moreover, it has the disadvantage that the required adjustment is very complicated.

SUMMARY OF THE INVENTION

An object of this invention is to provide a digital function fitter by which any non-linear characteristic can be digitally linearized.

Another object of this invention is to provide a digital function fitter by which any non-linear characteristic can be inexpensively linearized with high accuracy.

A further object of this invention is to provide a digital function fitter which is not affected by temperature and noise.

A still further object of this invention is to provide a digital function fitter which doesn't require a complicated adjustment.

The above, and other objects, features and advantages of the invention, will be apparent in the following detailed description of illustrative embodiment thereof which is to be read in connection with the accompanying drawings.

DESCRIPTION OF THE PREFERRED EMBODIMENTS

Figure 1:
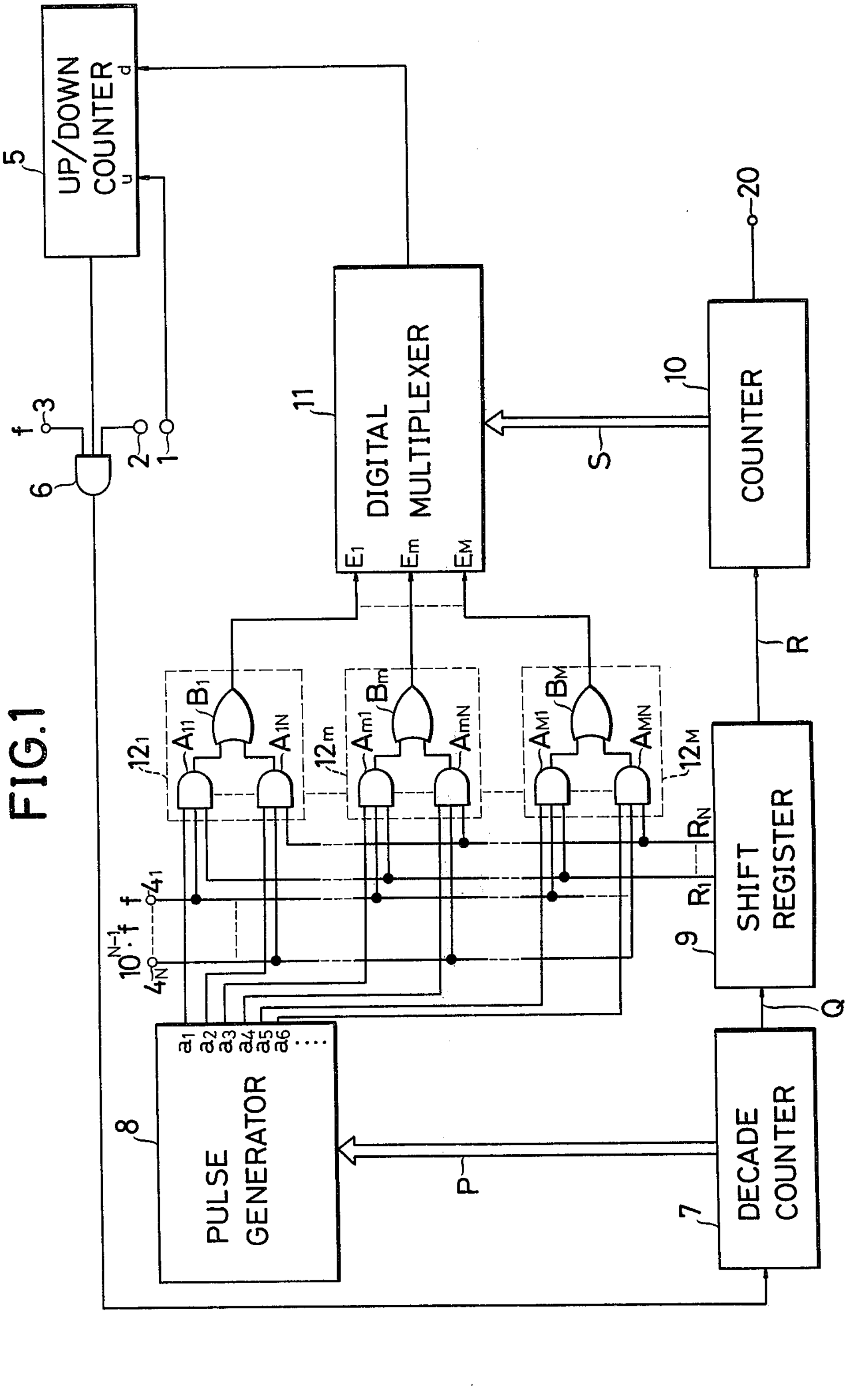
FIG. 1 is a circuit diagram of a digital function fitter according to one embodiment of this invention.

Referring to FIG. 1, an input terminal 1 is connected to an up-terminal of an UP/DOWN counter 5. A non-linear digital input, for example, converted from the analog value corresponding to the thermoelectromotive force of the thermocouple, is applied to the input terminal 1. Output of the UP/DOWN counter 5 is applied to an AND-circuit 6. Clock pulses with frequency $f$ are applied to an input terminal 3 of the AND-circuit 6. A pulse is applied to another input terminal 2 of the AND-circuit 6, signifying the end of the non-linear digital input. Clock pulses with frequencies $f$, $10f$ . . . , $10^{N-1}f$ are applied to input terminals $4_1$, $4_2$ . . . , $4_N$, respectively. Output of the AND-circuit 6 is applied to a decade counter 7. One output P of the decade counter 7 is applied to a pulse generator 8. The widths of different pulses from the pulse generator 8 are controlled by the output P. Another output Q of the decade counter 7 is applied to an N-bit shift register 9 which is of series-input and parallel-output type. Output R of the shift register 9 is applied to a counter 10. Output S of the counter 10 is applied to a digital Multiplexer 11.

M gate circuits $12_1$, $12_2$ . . . $12_M$ are arranged in the digital function fitter. The first gate circuit $12_1$, the m-th gate circuit $12_m$ and the M-th gate circuit $12_M$ are representatively shown in FIG. 1. Each gate circuit $12_1$, $12_m$ . . . $12_M$ comprises N AND-circuits $A_{11}$ ($A_{m1}$, $A_{M1}$), . . . $A_{1N}$ ($A_{mN}$, $A_{MN}$) and an OR-circuit $B_1$ ($B_m$, $B_M$). Outputs of the N AND-circuits $A_{11}$ ($A_{m1}$, $A_{M1}$), . . . $A_{1N}$($A_{mN}$, $A_{MN}$) are applied to N input terminals of the OR-circuit $B_1$ ($B_m$, $B_M$). Outputs of the gate circuits $12_1$, $12_2$ . . . $12_M$ are applied to input terminals $E_1$, $E_2$, . . . $E_m$ . . . , $E_M$ of the digital Multiplexer 11, respectively. The clock pulses with frequencies $f$, $10f$, . . . $10^{N-1}f$, the outputs $R_1$, $R_2$ . . . $R_N$ of the N-bit shift register 9, and the outputs of the pulse generator 8 are applied to three input terminals of the N AND-circuits $A_{11}$ ($A_{m1}$, $A_{M1}$) . . . $A_{1N}$ ($A_{mN}$, $A_{MN}$), respectively. The output terminals $a_1$, $a_2$ . . . are selectively connected to the input terminals of the N AND-circuits $A_{11}$ ($A_{m1}$, $A_{M1}$) . . . $A_{1N}$ ($A_{mN}$, $A_{MN}$). Output of the Multiplexer 11 is supplied to the down-teriminal $d$ of the UP/DOWN counter 5.

Figure 2:
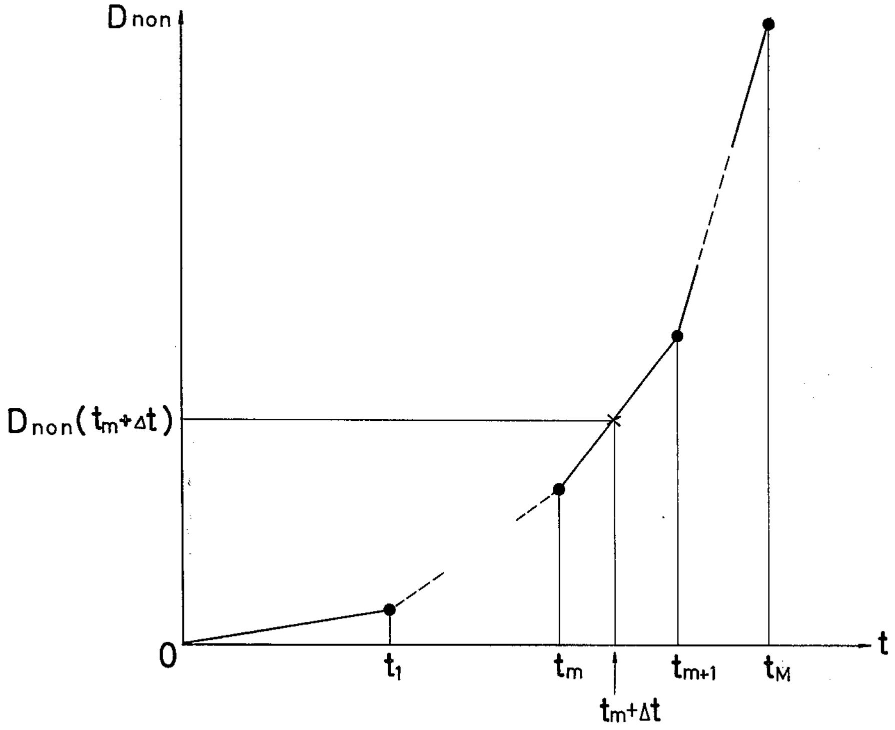
FIG. 2 is a graph showing the relationship between non-linear digital values and linearized values.

Next, operations of the digital function fitter according to this invention will be described with reference to FIG. 1 and FIG. 2. The non-linear digital input $D_{non}$ is applied to the up-terminal U of the UP/DOWN counter 5 to be counted thereby. With the beginning of the counting, the output of the UP/DOWN counter 5 is put into "1" level. During the counting, the level of the input applied to the input terminal 2 is "0". As soon as the counting of the non-linear digital input ends, a pulse with the level 1 is applied to the input terminal 2 to signify the end of the counting of the non-linear digital input $D_{non}$. The output of the UP/DOWN counter 5 is still maintained at the level 1. Accordingly, the clock pulses from the input terminal 3 are applied to the decade counter 7 preset to 0 through the AND-circuit 6. The counting outputs P and Q of the decade counter 7 are applied to the pulse generator 8 and to the N-bit shift register 9 respectively. The output R of the N-bit shift register 9 is applied to the counter 10 preset to 0 to be counted thereby.

The pulses with the widths $1/f$, $2/f$ . . . $10/f$ are generated from the pulse generator 8 by the output P of the decade counter 7. According to this embodiment, M gate circuits $12_1$ . . . $12_M$ are provided for M broken lines-approximation. In FIG. 2, $D_{non}$ represents the non-linear digital value of the non-linear digital input and $t$ a linearlized digital value.

If a non-linear digital input $D_{non}$ ($t_m + \Delta t$) is linearized to a linear digital value $t_m + \Delta t$, the following relationship is obtained:

$$D_{non}\,(t_m + \Delta t) = \sum_{m=1}^{m} \sum_{n=1}^{N} 10^{n-1} \cdot a_{mn} + \sum_{n=1}^{n} 10^{n-1} \cdot a_{(m+1)n},$$

where $a_{mn}$ represents an integral number, $$\sum_{n=1}^{N} 10^{n-1}$$

$a_{mn}$ an increase by the $m$-th broken line, $t_m$ a linearized digital value at the end of the $m$-th broken line and $\Delta t$ an increase from the value $t_m$ which is smaller than $t_{m+1} - t_m$. In the first gate circuit $12_1$, the pulses with the widths $a11/f$, $a12/f$ . . . $a1N/f$ are applied to the AND-circuits $A_{11}$, $A_{12}$ . . . $A_{1N}$ from the pulse generator 8, respectively. An input pulse with "1" level is applied in turn to the respective one input terminals of the AND-circuits $A_{11}$, $A_{12}$ . . . $A_{1N}$ from the N-bit shift register 9. In the m-th gate circuit $12_m$, the pulses with the widths $am1/f$, $am2/f$ . . . $amN/f$ are applied to the AND-circuits $A_{m1}$, $A_{m2}$, . . . $A_{mN}$, respectively. Similarly, the input pulse with " 1" level is applied in turn to the respective one input terminals of the AND-circuits $A_{m1}$, $A_{m2}$ . . . $A_{mN}$ from the N-bit shift register 9.

Till the counter 10 counts a digital value $t_1$, pulses are generated from the Multiplexer 11 through the terminal $E_1$ thereof. The number of the pulses from the gate circuit $12_1$ is $$\sum_{n=1}^{N} 10^{n-1} \cdot a_{1n},$$

which is supplied to the d-terminal of the UP/DOWN counter 5 through the Multiplexer 11.

Till the counter 10 counts a digital value $t_m$ from $t_{m-1}$+1, pulses are generated from the Multiplexer 11 through the terminal $E_m$ thereof. The number of the pulses from the gate circuit $12_m$ is $$\sum_{n=1}^{N} 10^{n-1} \cdot a_{mn},$$

which is supplied to the d-terminal of the UP-DOWN counter 5 through the Multiplexer 11.

Moreover, till the counter 10 counts a digital value $t_m + \Delta t$ from $t_m$+1, pulses are generated from the Multiplexer 11 through the terminal $E_{m+1}$(not shown) thereof. The number of the pulses from the gate circuit $12_{m+1}$ (not shown) is $$\sum_{n=1}^{N} 10^{n-1} \cdot$$

$a_{(m+1)n}$, which is supplied to the d-terminal of the UP/-DOWN counter 5 through the Multiplexer 11.

Consequently, the number of the pulses, $$\sum_{m=1}^{M} \sum_{n=1}^{N} 10^{n-1} \cdot a_{mn} + \sum_{n=1}^{N} 10^{n-1} \cdot a_{(m+1)n}$$

is supplied to the d-terminal of the UP/DOWN counter 5. When the number of the applied pulses coincides with the non-linear digital input $D_{non}(t_m + \Delta t)$, the output of the UP/DOWN counter 5 is put into 0, so that the clock pulses are not transmitted from the AND-circuit 6 to the decade counter 7. Thus, the non-linear digital input $D_{non}$ $(t_m + \Delta t)$ is linearlized to $t_m + \Delta t$. The linearized output is obtained from an output terminal 20 of the counter 10.

According to this invention, the division can be set even to one digit. Therefore, a non-linear digital input can be linearized with high accuracy. The connections between the output terminals $a_1$, $a_2$, $a_3$. . . of the pulse generator 8 and the input terminals of the gate circuits $12_1$, $12_2$ . . . $12_M$ can be varied with non-linear characteristics to easily linearilize any non-linear digital input.

If an increase $$\sum_{n=1}^{N} 10^{n-1} \cdot a_{mn}$$

is an integral number of two figures, a Flip-Flop circuit can be used instead of the N-bit shift register.

Figure 3:
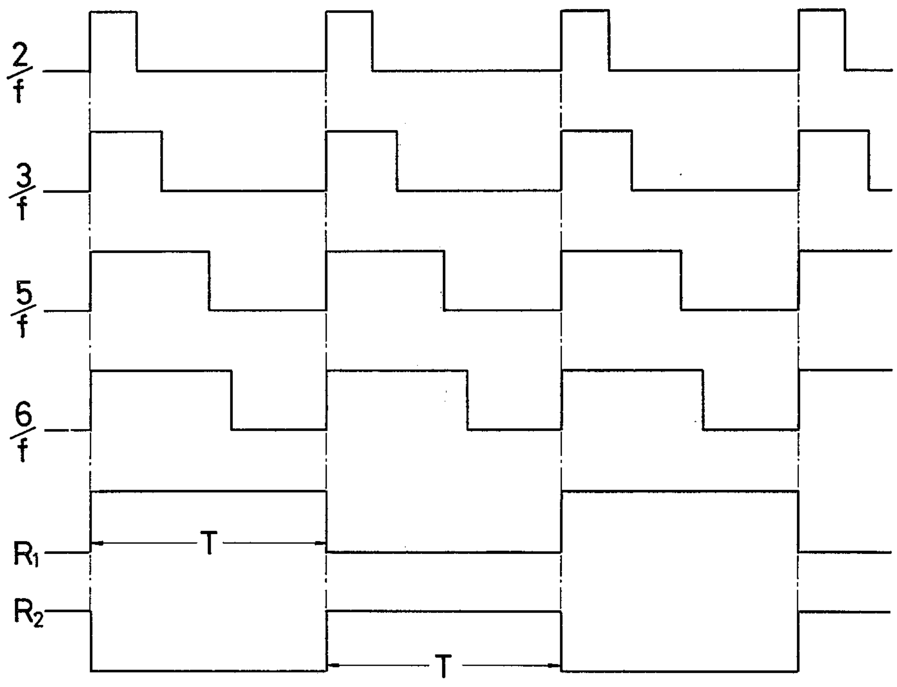
FIG. 3 and FIG. 4 are graphs showing the relationships among the pulses in the digital function fitter when a Flip-Flop circuit is used as an N-bit shift register.

The case that the Flip-Flop circuit is used will be described with reference to FIG. 3 and FIG. 4, in order to deepen the understanding of this invention. The Flip-Flop circuit is considered to be a 2-bit shift register. In that case, there are provided two clock pulse input terminals $4_1$ and $4_2$ to which the clock pulses with the frequencies f and 10f are applied, respectively. Corresponding to the clock pulse input terminals $4_1$ and $4_2$, there are provided two AND-circuits ($A_{11}$, $A_{12}$), ($A_{21}$, $A_{22}$) . . . in each gate circuit $12_1$, $12_2$ . . . . For example, the pulses with the widths $5/f$, $2/f$, $6/f$ and $3/f$ are applied to the input terminals of the AND-circuits $A_{11}$, $A_{12}$, $A_{21}$ and $A_{22}$ from the pulse generator 8. The pulse with the width $10/f$ or period T are generated alternately at the $R_1$ and $R_2$ terminals of the Flip-Flop circuit 9 (FIG. 3). While the one pulse with the width $5/f$ and the other pulse $R_1$ with the time interval T are applied to the input terminals of the AND-circuit $A_{11}$ in the first gate circuit $12_1$, five pulses are supplied to the down terminal d of the UP/DOWN counter 5 through the first gate circuit $12_1$ and the $E_1$ terminal of the Multiplexer 11 from the terminal $4_1$. While the one pulse with the width $2/f$ and the other pulse $R_2$ with the time interval T are applied to the input terminals of the AND-circuit $A_{12}$ in the first gate circuit $12_1$, $2 \times 10$ pulses are supplied to the down terminal $d$ of the UP/-DOWN counter 5 through the first gate circuit $12_1$ and the $E_1$ terminal of the Multiplexer 11 from the terminal $4_2$. Consequently, $5 + 20 = 25$ pulses are supplied to the down terminal $d$ of the UP/DOWN counter 5 through the first gate circuit $12_1$ and the $E_1$ terminal of the Multiplexer 11. Next, the pulses are supplied to the down terminal d of the UP/DOWN counter 5 through the second gate circuit $12_2$ and the $E_2$ terminal of the Multiplexer 11 changed over from the $E_1$ terminal. While the one pulse with the width $6/f$ and the other pulse $R_1$ with the time interval T are applied to the input terminals of the AND-circuit $A_{21}$ in the second gate circuit $12_2$, six pulses are supplied to the down terminal d of the UP/DOWN counter 5 through the second gate circuit $12_2$ and the $E_2$ terminal of the Multiplexer 11 from the terminal $4_1$. While the one pulse with the width $3/f$ and the other pulses $R_2$ with the time interval T are applied to the input terminals of the AND-circuit $A_{22}$ in the second gate circuit $12_2$, $3 \times 10$ pulses are supplied to the down terminal d of the UP/-DOWN counter 5 through the second gate circuit $12_2$ and the $E_2$ terminal of the Multiplexer 11 from the terminal $4_2$. Consequently, $6 + 30 = 36$ pulses are supplied to the down terminal $d$ of the UP/DOWN counter 5 through the second gate circuit $12_2$ and the $E_2$ terminal of the Multiplexer 11.

On the other hand, the pulse R from the Flip-Flop circuit 9 is counted by the counter 10. For example, the pulse R is equal to the above mentioned pulse $R_1$.

If 61 pulses have been supplied to the up-terminal u of the UP/DOWN counter 5 (FIG. 4-I), the number of the pulses supplied from the gate circuits $12_1$ and $12_2$ coincides with the number of the pulses stored in the UP/DOWN counter 5.

Figure 4:
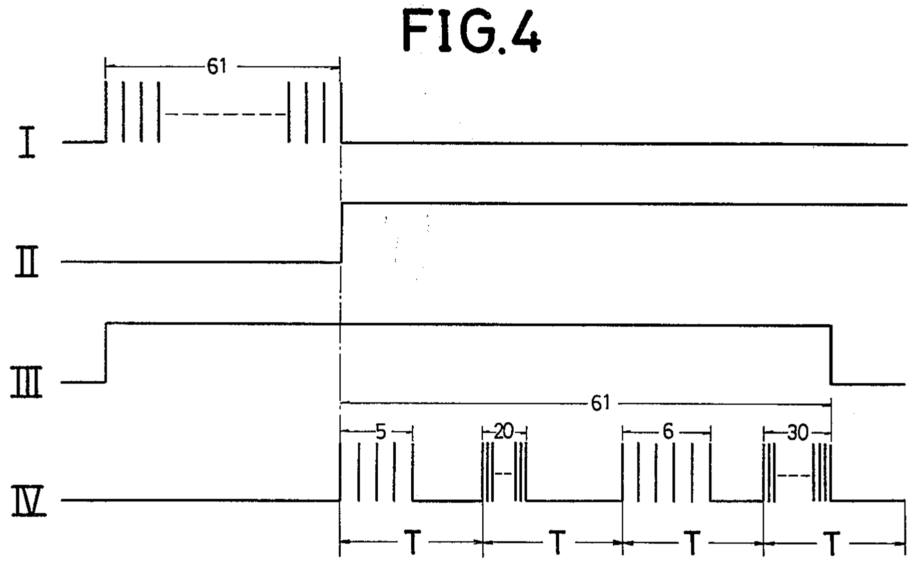

FIG. 4-II shows the wave form of the end pulse applied to the input terminal of the AND-circuit 6. FIG. 4-III shows the wave form of the output from the UP/-DOWN counter 5 which is to put into 1 level with the application of the pulses to the up-terminal u of the UP/DOWN counter 5. As soon as $5+20+6+30=61$ pulses are supplied to the down terminal d of the UP/-DOWN counter 5 (FIG. 4-IV), namely as soon as the number of the pulses supplied to the down terminal *d* of the UP/DOWN counter 5 coincides with the number of the pulses stored in the UP/DOWN counter 5, the output from the UP/DOWN counter 5 is put into 0 level (FIG. 4-III, IV). Consequently, the clock pulses cannot pass the AND-circuit 6. Thus, the non-linear digital input to the up-terminal u of the UP/DOWN counter 5 can be linearlized.

Figure 5:
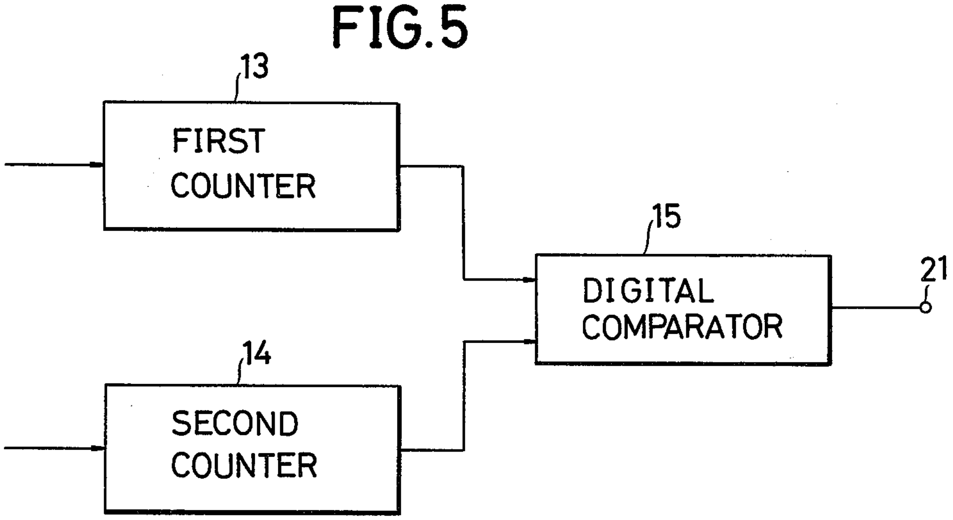
FIG. 5 is a block diagram showing a modification of the UP/DOWN counter in FIG. 1.

A counting circuit shown on FIG. 5 may be used instead of the UP/DOWN counter 5. In FIG. 3, the non-linear digital input $D_{non}$ is applied to a first counter 13 and the output from the Multiplexer 11 is applied to a second counter 14. Outputs from the first and second counters 13 and 14 are applied to a digital comparator 15. An output terminal 21 of the digital comparator 15 is connected to one terminal of the AND-circuit 6. When the outputs from the first and second counters 13 and 14 coincide with each other, the output from the digital comparator 15 is put into 0 level from 1 level.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention as defined in the appended claims.

What is claimed is:

1. A digital function fitter comprising: means for storing a number of input pulses; a first clock pulse generator;

means for counting the number of clock pulses;

a plurality of second clock pulse generators generating pulses different from one another in frequency; and means for supplying clock pulses with different frequencies for predetermined intervals to said storing means, said clock pulses ceasing to be applied by said first clock pulse generator to said counting means when the pulses supplied to said storing means coincide with a stored number of input pulses.

2. A digital function fitter according to claim 1, wherein said storing means is an UP/DOWN counter, and said counting means is a decade counter.

3. A digital function fitter according to claim 1, wherein said clock pulse supplying means comprises a plurality of gate circuits, a shift register, a second pulse generator and a multiplexer.

4. A digital function fitter according to claim 2, wherein a three input terminal AND-circuit is connected between said UP/DOWN counter and said decade counter and wherein the output of said first clock pulse generator, an end pulse signifying the end of said input pulses, and the output of said UP/DOWN counter are applied to the input terminals of said AND-circuit.

5. A digital function fitter according to claim 3, wherein said shift register and said second pulse generator are operated by said means for counting the number of clock pulses.

6. A digital function fitter according to claim 3, wherein each of said gate circuits comprises a plurality of AND-circuits and one OR-circuit.

7. A digital function fitter according to claim 1, wherein said storing means comprises first and second counters, and a digital comparator.

* * * * *

CO-1050
(5/69)

UNITED STATES PATENT OFFICE
CERTIFICATE OF CORRECTION

Patent No. 3,930,144 Dated December 30, 1975

Inventor(s) Katsuaki Tanaka

It is certified that error appears in the above-identified patent and that said Letters Patent are hereby corrected as shown below:

Column 2, line 42, the number "1" should read --"1"--.

Column 2, line 45, the number "1" should read --"1"--.

Column 2, line 47, the number "0" should read --"0"--.

Column 2, line 52, the number "0" should read --"0"--.

Column 3, line 65, the number "0" should read --"0"--.

Column 5, line 14, the number "1" should read --"1"--.

Column 5, line 22, the number "0" should read --"0"--.

Column 5, line 37, the number "0" should read --"0"--; same line, after "from", number "1" should read --"1"--.

Signed and Sealed this

Thirteenth Day of July 1976

[SEAL]

*Attest:*

RUTH C. MASON
*Attesting Officer*

C. MARSHALL DANN
*Commissioner of Patents and Trademarks*